United States Patent
Shkolnikov

(10) Patent No.: US 10,424,108 B2
(45) Date of Patent: Sep. 24, 2019

(54) SHADOW CASTING FOR AN ELEVATION DATA GRID

(71) Applicant: Intergraph Corporation, Madison, AL (US)

(72) Inventor: Ilya A. Shkolnikov, Huntsville, AL (US)

(73) Assignee: INTERGRAPH CORPORATION, Madison, AL (US)

( * ) Notice: Subject to any disclaimer, the term of this patent is extended or adjusted under 35 U.S.C. 154(b) by 40 days.

(21) Appl. No.: 15/909,499

(22) Filed: Mar. 1, 2018

(65) Prior Publication Data

US 2018/0253893 A1    Sep. 6, 2018

Related U.S. Application Data

(60) Provisional application No. 62/466,531, filed on Mar. 3, 2017.

(51) Int. Cl.
*G06T 15/04* (2011.01)
*G06T 15/60* (2006.01)

(52) U.S. Cl.
CPC .............. *G06T 15/60* (2013.01); *G06T 15/04* (2013.01); *G06T 2215/12* (2013.01)

(58) Field of Classification Search
None
See application file for complete search history.

(56) References Cited

U.S. PATENT DOCUMENTS

| 6,664,962 B1 | 12/2003 | Komsthoeft et al. |
| 8,291,345 B2 | 10/2012 | Howard |
| 9,550,244 B2 | 1/2017 | Maringer |
| 2003/0023412 A1 | 1/2003 | Rappaport et al. |
| 2010/0295851 A1 | 11/2010 | Diamand |
| 2012/0035887 A1 | 2/2012 | Augenbraun et al. |

FOREIGN PATENT DOCUMENTS

EP    2234069 A1    9/2010

OTHER PUBLICATIONS

Frida Hernell, Patric Ljung, Anders Ynnernnan, Local Ambient Occlusion in Direct Volume Rendering, 2010, IEEE Transactions on Visualization and Computer Graphics, 16(4):548-559 (Year: 2010).*

(Continued)

*Primary Examiner* — Michael J Cobb
(74) *Attorney, Agent, or Firm* — Nutter McClennen & Fish LLP

(57) ABSTRACT

A computer-implemented method for creating a shadow mask representing irradiation of a physical scene based upon a plurality of elevation grid points of an array of elevation data associated with the physical scene. Elevation point data are received and stored in array format and a shadow frontline is propagated across the array based on a quadrant associated with a light source. A shadow horizon is projection onto successive lines of elevation data generating a binary shadow mask based on whether a specified elevation point lies above or below the shadow horizon. The direction of the light source may be transformed to reflect curvature of an underlying surface of the physical scene.

9 Claims, 6 Drawing Sheets

(56) References Cited

OTHER PUBLICATIONS

Williams, "Casting Curved Shadows on Curved Surfaces," *SIGGRAPH '78 Proc. 5th Annual Conf. on Computer Graphics,* pp. 270-274 (1978).
Tovar-Pescador et al., "On the use of the digital elevation model to estimate the solar radiation in areas of complex topography,"*Meteorol Appl.* vol. 13, pp. 279-287 (2006).
U.S. Army Corps of Engineers, "Handbook for Transformation of Datums, Projections, Grids and Common Coordinate Systems," *Topographic Engineering Center,* 165 pages (1996).
Giles, "Remote Sensing and Cast Shadows in Mountainous Terrain," *Photogrammetric Engineering & Remote Sensing,* vol. 67, No. 7, pp. 833-839 (Jul. 2001).
Kang et al, "Acceleration of Terrain Rendering Using Cube Mesh," *Lecture Notes in Computer Science,* Springer, pp. 71-79 (Jul. 2007).
Weinhaus et al., "Texture Mapping 3D Models of Real-World Scenes,"ACM Computing Surveys, vol. 29, No. 4, pp. 325-365 (Dec. 1997).
Wikipedia, the free encyclopedia, "Shadow Mapping," 7 pages [retrieved from the internet: URL:https://en.wikipedia.org/w/index.php?title=Shadow_mapping&oldid-632600511 (Nov. 2015).
Dolloff et al., "Replacement Sensor Model Tagged Record Extensions Specification for NITF 2.1," 281 pages (Jan. 2013).

\* cited by examiner

Prior Art

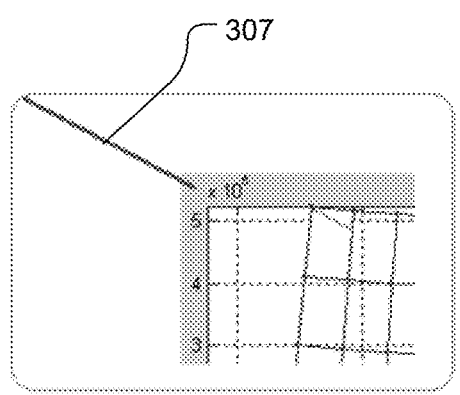
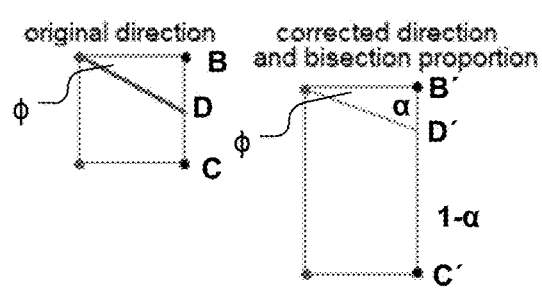
Fig. 7A
Fig. 7B
Fig. 7C

SHADOW CASTING FOR AN ELEVATION DATA GRID

The present application claims priority from U.S. Provisional Patent Application Ser. No. 62/466,531, filed Mar. 3, 2017, which is incorporated herein by reference.

TECHNICAL FIELD

The present invention relates to the generation of shadows in images, and, more particularly, to methods and apparatus for performing shadowing on the basis of very large 2.5-dimensional (2.5D) elevation data sets.

BACKGROUND ART

Shadow mapping over an illuminated terrain is an inherent part of topographic relief shading techniques. Unless blocked from the light source, a given grid point on a surface is subject to a direct beam radiance defined by a local normal to the surface at the given grid point and local slope and aspect angles, which can be estimated using as small a local area as a 3×3 pixel kernel around the given grid point.

Preliminary Definitions: As used herein, and in any appended claims, the following terms shall have the meanings indicated, unless the context dictates otherwise:

The term "shadowing," or, synonymously, "shadow mapping," "shadow casting," or "shadow projection," as used herein, shall denote adding shadows to a three-dimensional image of a scene. A particular example includes the generation of a radiance map (as defined below) of incident or reflected light energy as a blocking mask (as the term is defined below) for a direct beam radiance component of total insolation energy flux. However, it is to be understood that the scope of the invention encompasses shadowing, whether or not a blocking mask is produced.

A "map" is a function (finite, but not necessarily continuous) assigning a value to each point in a domain.

The term "radiance map" shall denote a map assigning a value (which may have units, or not) to each point of a terrestrial area, associated with whether light from a specified source reaches that point.

A "blocking mask" is a radiance map that assumes one of two binary values, indicating whether light from a specified source reaches each point of a terrestrial area or not.

The term "insolation energy flux" refers either to watt-hours per square meter for a specified duration of time, or to instantaneous watts per square meter (i.e., a insolation power flux) incident at a specified terrestrial point due to irradiation by a specified source, typically the Sun, whether directly or due to scattering or reflection. The component of the insolation energy flux that is due to direct illumination of a point is called the "direct beam radiance component of the total insolation energy flux."

The term "slope" shall refer to the magnitude (the modulus) of the gradient of elevation taken at a local point.

The term "aspect angle" shall refer to the direction in which the gradient of elevation at a local point is maximal, defined with respect to a specified fiducial direction, typically north.

The term "sky view" shall mean the line of sight along a ray from a specified point to effectively infinity in a specified direction.

A "viewshed" shall mean the sky view in all directions relative to a specified point, which is to say, all surrounding points that are in line-of-sight (LOS) with the specified point.

The term "light vector" denotes a direction in space from a given point to the position of a source of illumination, as defined by the centroid of its brightness profile. "Brightness" and other photometric terms are as defined in Lang, *Astrophysical Formulae* (1980). The source of illumination is effectively at infinite distance from an anchor point, which is to say that the wavefront of light emanating from the source of illumination is effectively normal to all rays emanating from the source of illumination and incident upon the anchor point (defined below). The direction associated with a light vector may be specified in azimuth-elevation (AZ-EL) coordinates, or in accordance with any other system of coordinates. It is to be understood that the same term "light vector" applies, in equal measure, to a ray oriented along the same line but in the opposite direction, namely from the source of illumination to a specified anchor point.

The term "sun vector" denotes a light vector associated with the Sun. The term may be used heuristically herein for convenience of description, and may readily be generalized by a reader of ordinary skill in the art to encompass the Moon, or other illumination sources, natural or artificial.

The given point with respect to which directions (such as the aforementioned "light vector" or "sun vector") are determined is referred to herein as the "anchor point."

In areas of complex topography, geometry mandates that one must know the sky view in all directions for a point in order to determine if a given sun vector (specified, for example, in coordinates of (azimuth, elevation), referred to, herein, also as (AZ, EL)) is in view from that point, or not. Techniques to compute viewshed for a topographic point as a polar plot of radial coordinate for elevation and tangential coordinate for azimuth are designed in the paper by J. Tovar-Pescador et al., "On the use of the digital elevation model to estimate the solar radiation in areas of complex topography", Meteorol. Appl., vol. 13, 279-287 (2006). A schematic process to generate point-based viewshed maps designed by J. Tovar-Pescador et al. is shown in FIGS. 1A-1C. FIG. 1A shows a digital elevation model (DEM) of a scene centered about a specified grid point 101. FIG. 1B is an elevation cross section of the skyview relative to grid point 101, while FIG. 1C is an azimuth-elevation (AZ-EL) representation of the viewshed relative to grid point 101.

In addition to the absence of full 3D geometric data, another daunting feature of GIS data sets is the very large quantity of data that must be processed, often in a near real-time mode. The initial process to generate a viewshed for each point is computationally very expensive; however, the following shadow map generation for any given time of day (or intervals of time) is very fast. The accuracy limitation of the method is defined by a discrete number of azimuth directions selected to generate a viewshed profile in polar coordinates: interpolating between just 12 directions is obviously of lower fidelity than, say, 360 directions.

SUMMARY OF EMBODIMENTS OF THE PRESENT INVENTION

In accordance with embodiments of the present invention a computer-implemented method is provided for creating a shadow mask representing irradiation of a physical scene based upon a plurality of elevation grid points of an array of elevation data associated with the physical scene. The method has steps of:

receiving elevation point data in which an elevation value is associated with each of a plurality of spatial coordinates;

determining, for a specified anchor point, a direction to a light source characterized by an irradiance value at each elevation grid point;

associating with the light source a quadrant of an azimuthal circle;

selecting a shadow frontline propagation mode based on the quadrant associated with the light source;

propagating a shadow horizon along the array of elevation data by projection onto successive lines of elevation data;

recursively updating the shadow horizon stored in a frontline buffer of computer memory; and generating a binary shadow mask based on whether a specified elevation point lies above or below the shadow horizon.

In accordance with other embodiments of the present invention, there may an additional step of calculating an irradiance contribution to a total insolation incident upon a specified grid point based on the irradiance of the light source at the elevation grid point as modulated by the binary shadow mask.

In further embodiments of the present invention, the light source may be the Sun.

In yet further embodiments of the present invention, propagating a shadow horizon may have a further step of applying a transformation to the direction of the light source to reflect curvature of an underlying surface of the physical scene. The underlying surface of the physical scene may be substantially spherical, and may, more particularly, be the Earth.

In accordance with another aspect of the present invention, a computer program product is provided for use of a computer system for generating a shadow mask representing irradiation of a physical scene based upon a plurality of elevation grid points of an array of elevation data associated with the physical scene. The computer program product has a non-transitory computer-readable medium on which are stored computer instructions such that, when executed by a processor, the instructions cause the processor to:

receive elevation point data in which an elevation value is associated with each of a plurality of spatial coordinates;

determine, for a specified anchor point, a direction to a light source characterized by an irradiance value at each elevation grid point;

associate with the light source a quadrant of an azimuthal circle;

select a shadow frontline propagation mode based on the quadrant associated with the light source;

propagate a shadow horizon along the array of elevation data by projection onto successive lines of elevation data; and generate a binary shadow mask based on whether a specified elevation point lies above or below the shadow horizon.

In other embodiments, the instructions may also cause the processor to calculate an irradiance contribution to a total insolation incident upon a specified grid point based on the irradiance of the light source at the elevation grid point as modulated by the binary shadow mask. The instructions may further cause the processor to apply a transformation to the direction of the light source to reflect curvature of an underlying surface of the physical scene.

BRIEF DESCRIPTION OF THE DRAWINGS

The invention will be more fully understood by referring to the following Detailed Description of Specific Embodiments in conjunction with the Drawings, of which:

FIG. 1A shows a digital elevation model (DEM) of a scene centered about a specified grid point; FIG. 1B is an elevation cross section of the skyview relative to that point, while FIG. 1C is a prior art azimuth-elevation (AZ-EL) representation of a viewshed relative to the same point.

FIG. 7A shows the incident light vector with respect to the array of grid points of FIG. 5; FIG. 7B shows the original light vector direction and FIG. 7C shows the transformed direction in accordance with an embodiment of the present invention.

DETAILED DESCRIPTION OF SPECIFIC EMBODIMENTS

Figure 1:
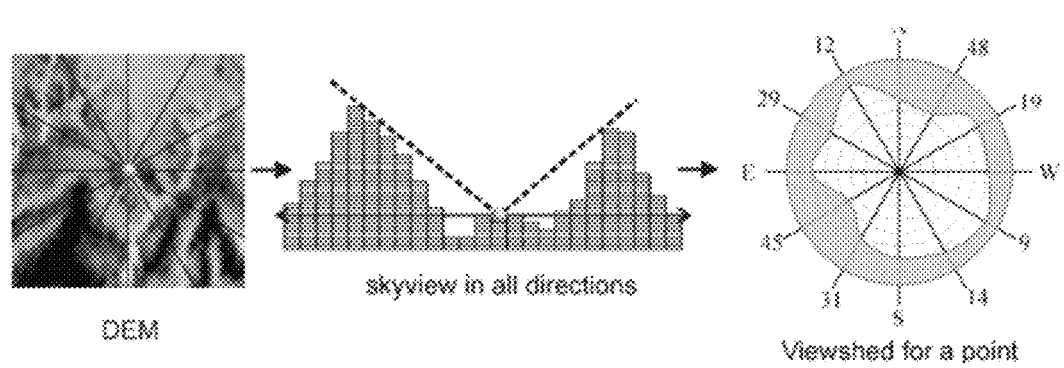

Further Definitions: As used herein, and in any appended claims, the following terms shall have the meanings indicated, unless the context dictates otherwise:

The term "image" shall refer to any multidimensional representation, whether in tangible or otherwise perceptible form, or otherwise, wherein a value of some characteristic (amplitude, phase, etc.) is associated with each of a plurality of locations (or, vectors in a Euclidean space, typically $R^2$) corresponding to dimensional coordinates of an object in physical space, though not necessarily mapped one-to-one thereonto. Thus, for example, the graphic display of the spatial distribution of some field, either scalar or vectorial, such as brightness or color, or intensity, constitutes an image. So, also, does an array of numbers, such as a 3D holographic dataset, in a computer memory or holographic medium. Similarly, "imaging" refers to the rendering of a stated physical characteristic in terms of one or more images.

The term "shadow map," used here synonymously with the terms "occlusion map," or "shadow mask," refers to a binary map in which pixels are tagged as visible, or not, as viewed from a locus in space denoted as the "viewer's position." A shadow map may be overlaid upon a 3-D rendering of a set of elevation data indicating whether any specified elevation grid point is exposed to irradiance from a specified source of illumination.

The term "point of illumination" may refer either to a point, in a rigorous geometrical sense, or to a "patch," in that it refers to an area, defined in three-dimensional space, that is compact, in a rigorous mathematical sense, from which light is assumed to emanate—typically, but not necessarily, in parallel rays—such as to illuminate a scene.

A "distant light source direction" refers to a direction from which light emanating from a source of illumination may be assumed to propagate with a planar phase front, i.e., with all rays traveling in parallel toward the illuminated scene.

The term "time" is used herein in the most general sense possible, and includes date and astronomical epoch, or whatever other parameters are used to indicate time in a desired frame of reference.

The term "elevation data," or, equivalently, "2.5D data," are data that provide elevations corresponding to specific point, or coordinates, on a surface, such as the surface of the Earth, for example. Elevation data may be collected in any number of manners, including remote sensing methods such as LIDAR, or other aerial survey methods, or by terrestrial surveys, again, by way of example only.

Three components contribute to the illumination at each elevation grid point: direct beam irradiance, diffuse radiation (skylight), and ground albedo (neighbourhood terrain illuminates any non-horizontal surface).

In accordance with embodiments of the present invention, methods are provided for generating a shadow mask in a manner that may be, advantageously, both memory-efficient and computationally fast. Many methods for creating shadow maps may be practiced in accordance with the prior art. The present invention pertains to various novel methods that are now described and claimed herein.

Figure 2:
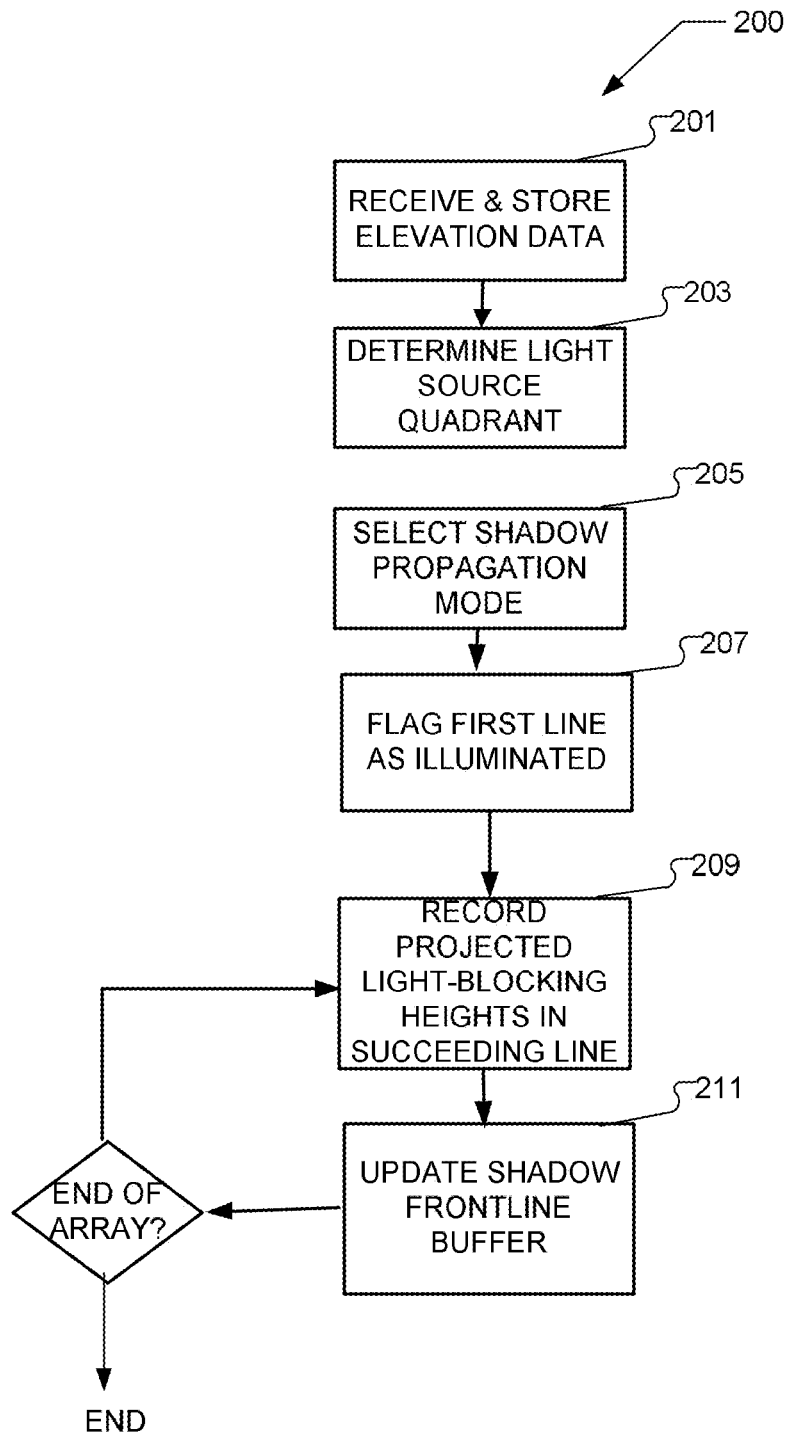
FIG. 2 is a schematic representation of shadow estimation with 2.5D data in accordance with an embodiment of the present invention.

A method of shadow estimation, in accordance with one embodiment of the present invention, is now described with reference to FIG. 2, where it is designated generally by numeral 200. It is to be understood that, within the scope of the present invention, steps in accordance with the method need not be performed in the sequence in which they are shown, described, or claimed. A step that is 'first'—as a matter of enumeration, is not necessarily temporally first, for example.

Figure 3:
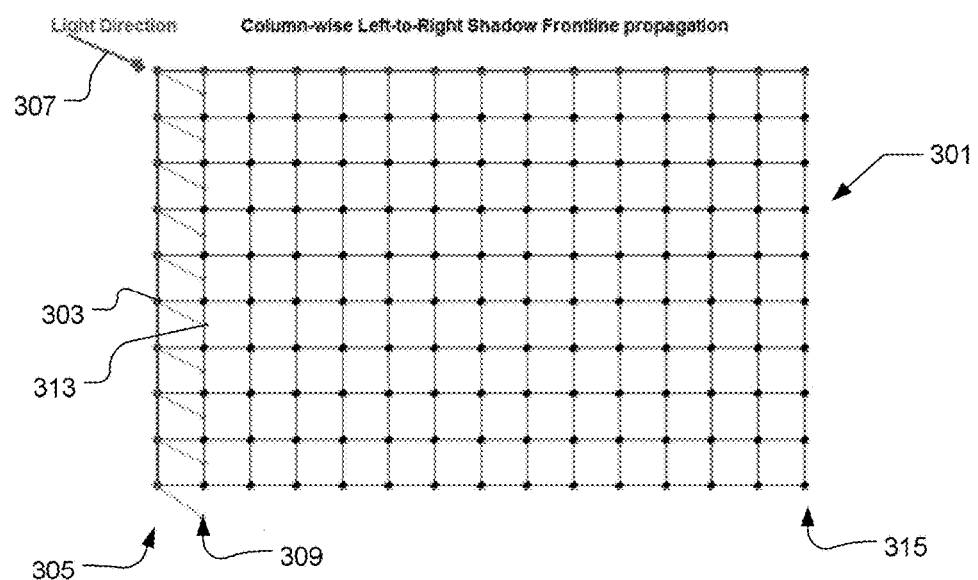
FIG. 3 is a flowchart depicting steps in the creation of a shadow map image in accordance with an embodiment of the present invention.

Elevation point data are acquired using aircraft or satellites or any other means, and it is assumed here, for heuristic convenience, that the data are received by a computer system 600 (shown in FIG. 8) and stored in a memory device 604 in an array designated generally by numeral 301 (shown in FIG. 3 in which rows correspond to the East-West direction (90° and 270° azimuth) and columns correspond to the North-South direction (0° and 180° azimuth). It is to be understood that the arbitrary assignment of an orientation to the data array is a heuristic convenience, and that the rotation of the array about the anchor point and corresponding modification of the algorithm described herein is within the competence of a reader of ordinary skill. Array 301 may also be referred to herein as "grid of points" 301, or as "grid" 301, and it is to be understood that, within the scope of the present invention, various points might be missing from array 301 and that the methods described and claimed herein may still be performed.

In order to begin a process of shadow mask generation, designated generally by numeral 200, elevation data are acquired, received and stored (201) in matrix format, which is to say that data are characterized by two indices indicating orthogonal cardinal directions, which, for heuristic purposes alone, are described herein as being North-South and East-West directions. Using the same orientation convention, a quadrant containing a specified light vector azimuth is identified (203). A "quadrant," otherwise referred to herein as a "sector," refers to a division of the azimuth circle into four parts, where azimuth is conventionally defined in a clockwise sense relative to 0° at a reference North direction. The azimuthal circle is a circle of 360° surrounding a specified anchor point. A "light vector azimuth" is the value of the azimuth component of a light vector, as defined above. The four quadrants (or sectors), respectively centered about the four cardinal directions, are the following:

NW-NE: between 315 and 45 degrees;
NE-SE: between 45 and 135 degrees;
SE-SW: between 135 and 225 degrees;
SW-NW between 225 and 315 degrees.

Based on the sector of the light vector azimuth, one of four shadow frontline propagation modes is selected (205):

NW-NE: row-wise from top to bottom;
NE-SE: column-wise from right to left;
SE-SW: row-wise from bottom to top;
SW-NW: column-wise from left to right.

As used herein and in any appended claims, the term "shadow frontline" shall refer to a row (or column, as the case may be) that is currently subject to computational evaluation as to whether a given point blocks a light vector from a specified source of illumination to a specified anchor point.

The "first line" corresponds to the external row or column (as the case may be) of the array 301 of elevation data toward the source of illumination. Thus, in the case of the source of illumination lying in the NW-NE quadrant, the first line is the top row 305 (referred to, hereinafter, as the first line, for heuristic convenience) of array 301. The shadow frontline is, initially, the first line. In step 207 (shown in FIG. 2) each point 303 of the first line is flagged as "illuminated" or "lit", and the elevation associated with each point 303 is marked as the "light-blocking height" in the shadow frontline.

Points 303 of the shadow frontline are projected (step 209) along light vector 307 onto the successive line 309 of array 301 and recorded. "Projected," as the term is used herein, means the connection of an elevation of the point 303 with the elevation of a point 313 in the successive line 309 by a line that is parallel to the light vector 307. In the successive line 309, light-blocking heights are recorded (209) as the greater of the elevation of each grid point in the elevation data or the projection of the elevation of a point in the preceding line 305. Grid points may be connected by a spline fit, such as a Hermitian spline, generating a curve 405 (shown in FIG. 4), referred to herein as a "shadow frontline" (defined above), separating light from dark, looking toward the direction of the illuminating source. The shadow frontline is stored (211) in a frontline buffer of computer memory, and recursively updated in successive lines (rows or columns). Propagation of a shadow to successive lines (rows or columns, as the case may be, depending on the quadrant in which the illuminating source appears) results in a shadow frontline, described in detail below with reference to FIG. 4. Recording the maximum heights in successive lines may be referred to as "collecting a new shadow frontline." Propagation of blocking heights is then repeated to successive lines until a final line 315 of array 301 is reached. Each grid point is thus marked by an elevation below which light from the source of illumination is blocked.

Frontline propagation, as heretofore described, may advantageously provide for memory-efficient and computationally fast generation of a shadow mask since input images need to be read line by line only (row-by-row or column-by-column) and the output mask image is written line-by-line without requiring an area cache. Once a given row or column is processed, the input line and output line can be removed from active memory and never accessed again; only a single shadow frontline 405 is retained, as stored in the frontline buffer.

Figure 4:
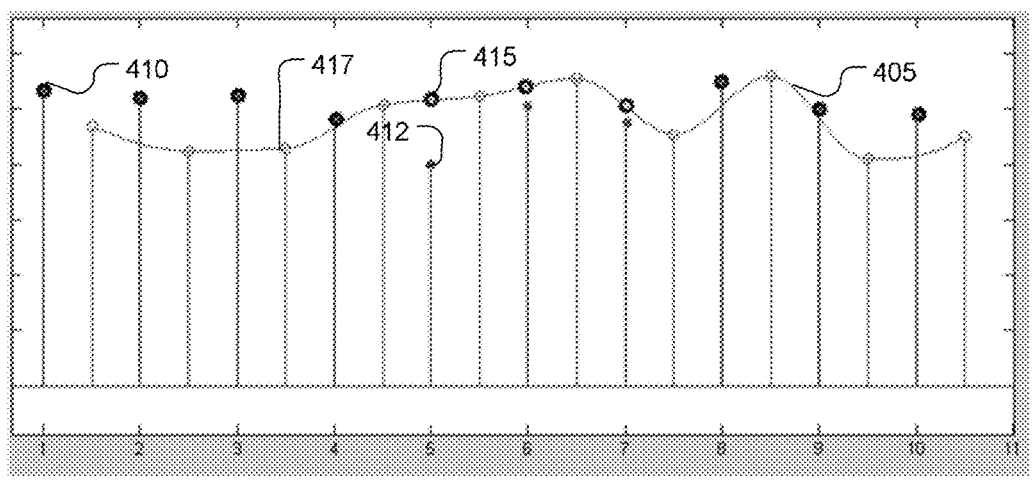
FIG. 4 is an image generated from 2.5D elevation data showing shadows cast in accordance with an embodiment of the present invention.

The contour of a shadow frontline 405 is now described with reference to FIG. 4, where solid ringed dots 410 represent sunlit points at the second column 309, solid blue dots 412 represent shadow points, and heavy open circles 415 represent the light-blocking heights collected into the shadow frontline 405 at the current step. Light open circles 417 represent the previous shadow frontline projected to the current line along the direction of light vector 307 (shown in FIG. 3), namely (−25°, −45°) of horizontal and vertical slope, in the current example. Spline curve 405 represents the "horizon line" separating light from dark at the current column looking west (to the Left, in FIG. 3). The terms "horizon line" and "shadow horizon" are entirely synonymous with "shadow frontline," as the term has been defined above. All elevated observers above the horizon line see the light of the illuminating source, whereas observers at positions 5, 6, and 7 in FIG. 4 are in the shadow, by virtue of the fact that their elevation is beneath the shadow frontline.

In accordance with other aspects of the present invention, shadow casting employs approximations with polynomial models of the rigorous 3D transforms between geodetic coordinates (latitude, longitude, height) or map-projected elevation grids (easting, northing, height) and anchored topocentric Cartesian grids, but, instead of applying the transform to the entire scene, the transform is applied to the light vector 307.

While a rigorous 3D transformation relating geodetic or map-projected data to topocentric data requires numerous nonlinear transformational terms, polynomial approximations may be used, whether continuous or piecewise smooth, within the scope of the present invention, and are notoriously well-known and commonly used to speed up XYZ transform of data consisting of massive numbers of points in three dimensions. This approach is used, in accordance with embodiments of the present invention, to model angular corrections to the direction of the local light vector 307.

Figure 5:
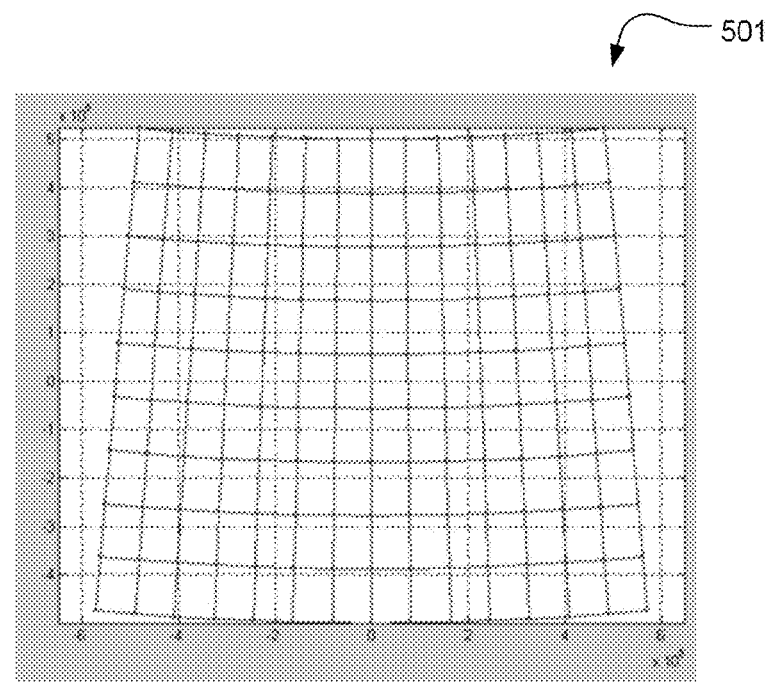
FIG. 5 shows the overall horizontal shape of an array regularly spaced grid points spanning 10 degrees in latitude and 15 degrees in longitude at a mid-latitude anchor point such as along the $49^{th}$ parallel North.
Figure 6:
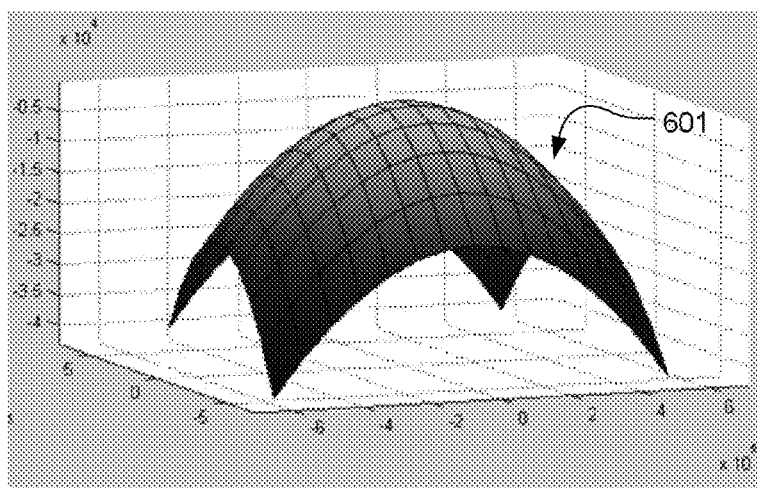
FIG. 6 shows the overall vertical shape of an array regularly spaced grid points spanning 10 degrees in latitude and 15 degrees in longitude at the mid-latitude anchor point used in FIG. 5.

As an example, if grid of points 301 (shown in FIG. 3) spans 10 degrees in latitude and 15 degrees in longitude at some mid-latitude anchor point (such as mid-Europe, or such as along the 49$^{th}$ parallel North that forms the US-Canada border), then the overall shape of array 301 in a topocentric Cartesian frame is as shown in FIG. 5 in horizontal 501 and in FIG. 6 in vertical 601.

Both rows and columns are not straight lines any more, with rows more curved than columns. Nevertheless, one can assume that a line segment between two immediately neighboring grid nodes is indeed a straight line, and there is only a need to correct the light direction (i.e., the direction of light vector 307, shown in FIG. 3) emanating from a grid node of the previous row or column with respect to horizontal and vertical orientation of the line segment connecting two points on both sides of the light ray as it intersects the next row or column.

As far as a single cell-rectangle is concerned, the process of light ray emanating from a corner and bisecting the opposite edge with a given ratio needs only a single correction to that ratio. All the local shape deformations such as differential scaling, rotation, shear, etc. cumulatively contribute to a single change in ratio at which the opposite edge is bisected—one correction to a horizontal ratio and one correction to a vertical elevation angle due to earth curvature.

These corrections as functions of the grid node (i,j) position in the matrix can be modelled by special bi-variate polynomials that retain only those terms that significantly contribute to the correction shape. The special polynomials that are used and their parameterization, based on $L_1$ norm minimization or otherwise, are very well-known in the art, and a rigorous description of their use need not be described here, but is left to the design choice of a reader of ordinary skill, and may be found in "Handbook for Transformation of Datums, Projections, Grids," (1996) and incorporated herein by reference. Any of a multitude of specific polynomial functions, whether continuous or piecewise smooth, may be selected, as a matter of design choice depending on the vertical/horizontal datum for a given elevation grid, and all are within the scope of the present invention. Geodetic grids obviously would have different correction forms than the map-projected grids, and the transverse Mercator projections may have a shape different from the conic Lambert projections, etc., though all are within the scope of the present invention as claimed. In accordance with embodiments of the present invention, the transformation that would be applied to the coordinate frame is applied to the incident light vector 307 as the shadow casting process described above is performed.

One example of a method for correcting the direction of light vector 307 is now described. For each row (assuming that frontline propagation is proceeding row-wise, and, else, mutatis mutandis, each column), a single polynomial is used for all points (x, y, z) relative to a fiducial anchor point (X, Y, Z). Discrepancies are collected, $$(dx,dy)=(F_x(X,Y,Z)-x, F_y(X,Y,Z)-y),$$

where ($F_x$, $F_y$) is the projection from geodetic (or Universal Transverse Mercator (UTM), etc.) onto local topocentric Cartesian coordinate system, otherwise referred to herein as "mapping axes."

A single polynomial is used to model each transverse dimension, such as $$dx=c_0y+c_1xy+c_2x^2+c_3y^2+c_4xz+c_5yz+c_6xy^2+c_7x^3+c_8x^2y+c_9y^3.$$

While the foregoing 10-term trivariate polynomial is provided by way of example, any model function may be used within the scope of the present invention. The polynomial that is employed serves to model $x_{topo}=x_{UTM}+dx$ at any point in three-dimensional UTM space (inside the grid 301, on the grid nodes, as well as outside), although the approximation accuracy degrades outside the grid cube used to fit the model. Other polynomial terms may be retained as a matter of design choice, based on the source datum—geodetic, UTM, projected conic Lambert, etc.

The parameter vector of coefficients $p_x=[c_o, \ldots, c_{1o}]$ is defined as a solution to a least squares minimization problem in which $\{B^*p_x-F_x(X,Y,Z)-x\}$ is minimized using standard numerical techniques. Thus, for each pixel in the original raster elevation grid 301, the correction to the bisection ratio is found for the succeeding line in the frontline propagation described above.

Referring to FIGS. 7B and 7C, a "bisection ratio" is defined for a conformal mapping (a holomorphic mapping that preserves angles locally, such as the mapping from geodetic to topocentric coordinates) as follows: For an angle $\phi$ that bisects an opposing line segment $\overline{BC}$ in the untransformed coordinate system (i.e, in the domain of the conformal mapping), the bisection ratio is the ratio of the length of the segment $\overline{B'D'}$ to the length of the segment $\overline{B'C'}$ in the transformed frame, where the ratio is denoted as $\alpha$, as shown in FIG. 7C.

While, in the original rectangular grid, given in, say, UTM coordinates, the bisection ratio is constant—it is $\alpha$ versus $(1-\alpha)$—for any two adjacent points on any column, in the transformed grid, becoming a quadrilateral mesh, the bisection ratio varies with pixel position.

As far as the elevation EL of the light vector 307 is concerned, it is corrected by applying a polynomial correction that is second-degree in the distance from the anchor point, where the coefficients have been determined by minimizing residuals to the discrepancy between geodetic and topocentric Cartesian coordinates relative to the anchor point.

Figure 8:
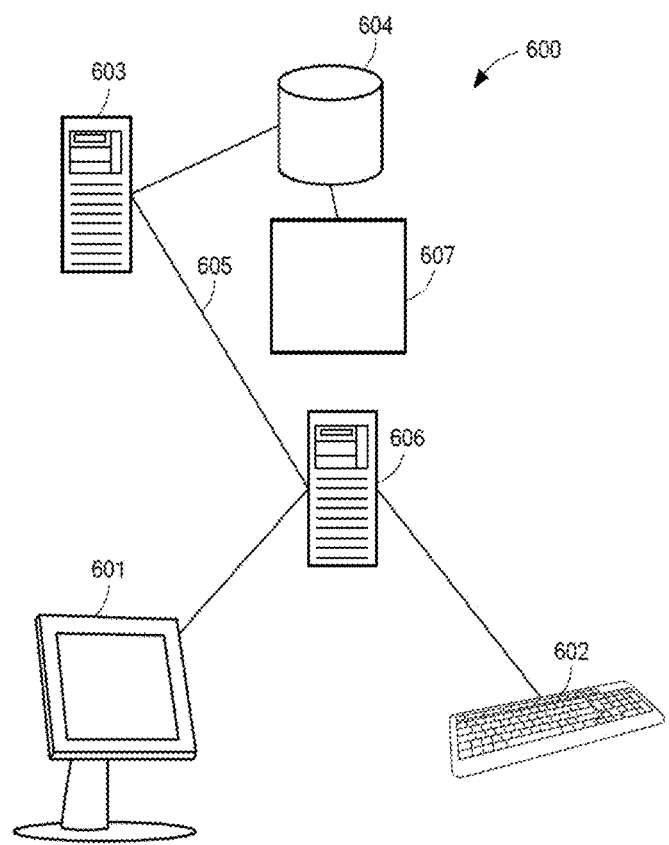
FIG. 8 schematically depicts one embodiment of a system that may be used to implement aspects of the present invention.

Various aspects of the invention may also be implemented as specialized software executing in a general-purpose computer system 600 such as that shown in FIG. 8. Alternatively, aspects of the present invention are advantageously implemented on mobile phones, tablets, and other devices. The computer system 600 may include a database server 603, 606 connected to one or more memory devices 604, such as a disk drive, memory, or other device for storing data. Database server 603 stores point elevation data comprising elevations at a plurality of points, or other data to which the present invention may be applied. A processor 607 (also referred to herein as a central processing unit, or processing server) contains computer-executable software configured to cast a shadow as taught in the foregoing description. Alternatively, a computer program product may have a non-transitory computer-readable medium on which are stored computer instructions such that, when executed by processor 607, the instructions cause the processor to cast a shadow as taught in the foregoing description. Memory 604 is typically used for storing programs and data during operation of the computer system 600. Components of computer system 600 may be coupled by an interconnection mechanism 605, which may include one or more buses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism).

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components than that shown in FIG. 8.

Processors 607 and operating systems employed in conjunction with servers 603 and 605 define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, while descriptions have been provided in terms of shadow casting, they are not limited to this context. The procedures are applicable to a wide variety of illumination rendering areas.

Moreover, where examples presented herein involve specific combinations of method acts or system elements, it should be understood that those acts and those elements may be combined in other ways to accomplish the same objective of shadow mapping. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the shadow estimation method have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A computer-implemented method for creating a shadow mask representing irradiation of a physical scene based upon a plurality of elevation grid points of an array of elevation data associated with the physical scene, the method comprising:
   a. receiving elevation point data in which an elevation value is associated with each of a plurality of spatial coordinates;
   b. determining, for a specified anchor point, a direction to a light source characterized by an irradiance value at each elevation grid point;
   c. associating with the light source a quadrant of an azimuthal circle;
   d. selecting a shadow frontline propagation mode based on the quadrant associated with the light source;
   e. propagating a shadow horizon along the array of elevation data by projection onto successive lines of elevation data;
   f. recursively updating the shadow horizon stored in a frontline buffer of computer memory; and
   g. generating a binary shadow mask based on whether a specified elevation point lies above or below the shadow horizon.

2. A computer-implemented method according to claim 1, further comprising calculating an irradiance contribution to a total insolation incident upon a specified grid point based on the irradiance of the light source at the elevation grid point as modulated by the binary shadow mask.

3. A computer-implemented method according to claim 1, wherein the light source is the Sun.

4. A computer-implemented method according to claim 1, wherein propagating a shadow horizon further comprises applying a transformation to the direction of the light source to reflect curvature of an underlying surface of the physical scene.

5. A computer implemented method according to claim 4, wherein the underlying surface of the physical scene is substantially spherical.

6. A computer-implemented method according to claim 4, wherein the underlying surface is of the physical scene is the Earth.

7. A computer program product for use of a computer system for generating a shadow mask representing irradiation of a physical scene based upon a plurality of elevation grid points of an array of elevation data associated with the physical scene, the computer program product comprising a non-transitory computer-readable medium on which are stored computer instructions such that, when executed by a processor, the instructions cause the processor to:
   a. receive elevation point data in which an elevation value is associated with each of a plurality of spatial coordinates;
   b. determine, for a specified anchor point, a direction to a light source characterized by a direction and an irradiance value at each elevation grid point;
   c. associate with the light source a quadrant of an azimuthal circle;
   d. select a shadow frontline propagation mode based on the quadrant associated with the light source;
   e. propagate a shadow horizon along the array of elevation data by projection onto successive lines of elevation data;
   f. recursively update the shadow horizon stored in a frontline buffer; and
   g. generate a binary shadow mask based on whether a specified elevation point lies above or below the shadow horizon.

8. A computer program product according to claim 7, wherein the instructions further cause the processor to calculate an irradiance contribution to a total insolation incident upon a specified grid point based on the irradiance of the light source at the elevation grid point as modulated by the binary shadow mask.

9. A computer program product according to claim 7, wherein the instructions further cause the processor to apply a transformation to the direction of the light source to reflect curvature of an underlying surface of the physical scene.

* * * * *